United States Patent [19]

Taaka et al.

[11] Patent Number: 5,530,555
[45] Date of Patent: Jun. 25, 1996

[54] METHOD AND APPARATUS FOR RECORDING HALFTONE DOT IMAGE WITH DIFFERENT REPEATING UNITS

[75] Inventors: Kazutaka Taaka; Masaaki Yamamura, both of Kyoto, Japan

[73] Assignee: Dainippon Screen Mfg. Co., Ltd., Kyoto, Japan

[21] Appl. No.: 104,706

[22] Filed: Aug. 11, 1993

[30] Foreign Application Priority Data

Sep. 9, 1992 [JP] Japan .................................. 4-267978

[51] Int. Cl.$^6$ .............................. H04N 1/40; H04N 1/46; G01D 15/14
[52] U.S. Cl. .......................... 358/298; 358/456; 358/536; 347/131
[58] Field of Search ..................... 358/298, 300, 358/456, 458, 459, 530, 534, 536; 347/131, 224, 251

[56] References Cited

U.S. PATENT DOCUMENTS

| | | | |
|---|---|---|---|
| 3,742,129 | 6/1973 | Roberts et al. | 358/534 |
| 4,149,183 | 4/1979 | Pellar et al. | 358/534 |
| 4,727,430 | 2/1988 | Miwa | 358/298 X |
| 4,903,123 | 2/1990 | Kawamura et al. | 358/456 X |
| 4,918,622 | 4/1990 | Granger et al. | 358/298 X |
| 4,924,301 | 5/1990 | Surbrook | 358/534 |
| 5,166,809 | 11/1992 | Surbrook | 358/456 |
| 5,357,344 | 10/1994 | Kasamatsu et al. | 358/298 |

FOREIGN PATENT DOCUMENTS

| | | | |
|---|---|---|---|
| 0293214A2 | 11/1988 | European Pat. Off. | H04N 1/40 |
| 0464650A2 | 1/1992 | European Pat. Off. | H04N 1/40 |
| 0493935A2 | 7/1992 | European Pat. Off. | H04N 1/40 |
| 2397112 | 2/1979 | France | H04N 1/00 |
| 2516329 | 5/1983 | France | H04N 1/40 |
| WO91/16783 | 10/1991 | Germany | H04N 1/40 |

*Primary Examiner*—Peter S. Wong
*Assistant Examiner*—Eric Frahm
*Attorney, Agent, or Firm*—Lowe, Price, Leblanc & Becker

[57] ABSTRACT

A method of, and an apparatus for, recording halftone dots on a photosensitive film by selecting halftone dots having different minimum repeating units in response to respective original image components. SPMs (103a to 103d) previously store screen pattern (SP) signals having different minimum repeating units, while address generation controllers (AGCp to AGCs) previously store address signals corresponding to the respective SP signals. Pattern selection signals (PPS) are inputted in response to respective original image components and the address signals are selected in correspondence thereto and inputted in the SPMs (103a to 103d), thereby reading the SP signals. Comparators (104a to 104d) compare pixel signals (DSa to DSd) expressing density levels of respective pixels forming a total image with the selected SP signals, to output halftone dot signals (DOTa to DOTd) in response to the result of this comparison. Thus, it is possible to select halftone dots having different minimum repeating units in response to respective original image components, to record the same on a photosensitive film.

2 Claims, 11 Drawing Sheets

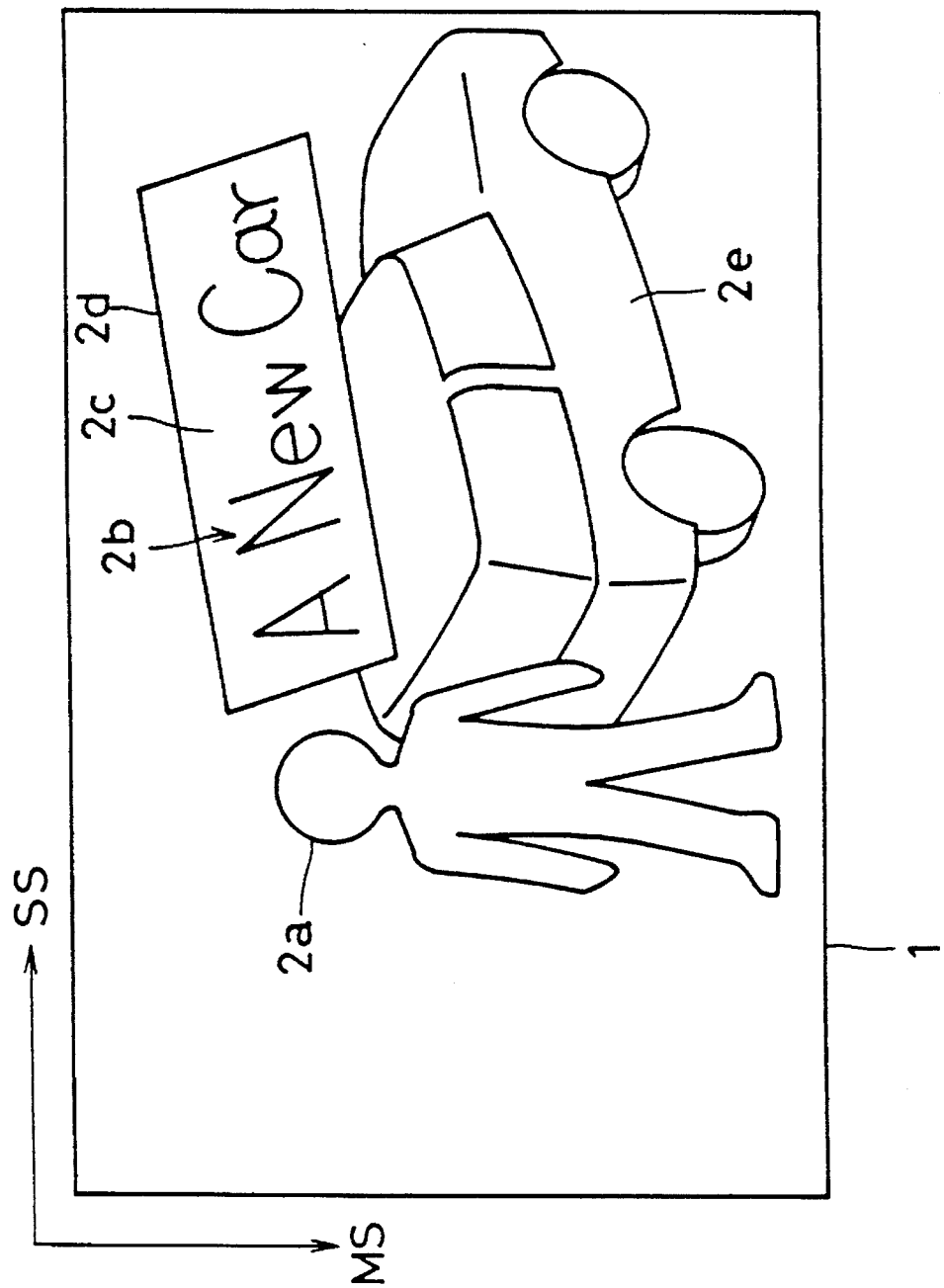

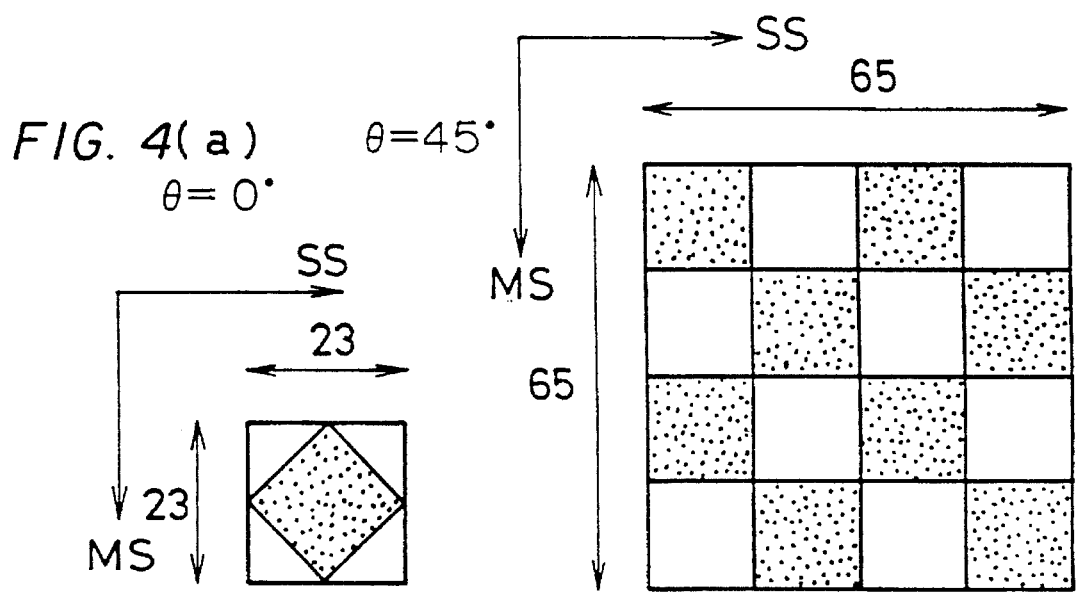
FIG. 4(a)
FIG. 4(b)
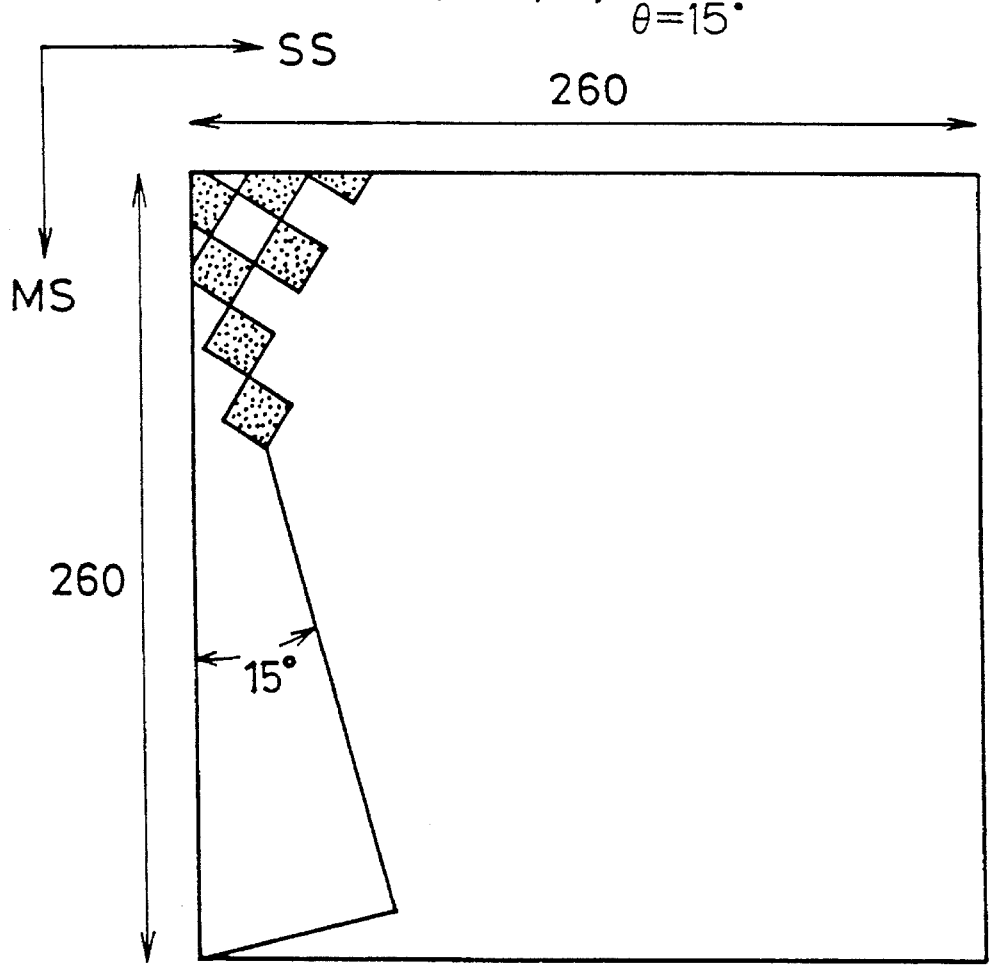
FIG. 4(c)

| 31 | 28 27 | 20 19 | 18 17 | 0 |
|---|---|---|---|---|
| ATTRIBUTE | TINT VALUE | PPS | ADDRESS CORRESPONDING TO BOUNDARY | |

METHOD AND APPARATUS FOR RECORDING HALFTONE DOT IMAGE WITH DIFFERENT REPEATING UNITS

BACKGROUND OF THE INVENTION

1. Field of the Invention

The present invention relates to a halftone dot recording method and a halftone dot recording apparatus for recording a total image which is formed by editing a plurality of types of original image components by selecting different types of halftone dots for the respective original image components on a photosensitive material.

2. Description of the Background Art

In a process of prepressing a total image which is formed by arranging a plurality of original image components in combination, halftone dots having different shapes are generally selected for the respective original image components, in order to improve a visual effect in a final print of the total image. In order to record such a total image by selecting a plurality of types of halftone dots for the respective components, however, an accurate operation is required with a large number of steps. To this end, U.S. Pat. No. 4,727,430 in the name of the assignee, for example, discloses a technique which is capable of recording a plurality of types of halftone dots having different shapes for respective original image components through single scanning in an image recording apparatus such as a color scanner. This technique is adapted to previously record a plurality of types of halftone dot signals expressing halftone dots of different shapes in a halftone dot signal memory and to appropriately select one from the plurality of types of halftone dot signals in a process of recording a total image on the basis of signals designating recording positions of respective original image components, thereby recording halftone dots.

In order to further improve the visual effect in the final print, it may be desirable to properly change not only the shapes of the halftone dots but screen rulings or screen angles in response to the original image components. In either case, it is necessary to also change the minimum repeating units for the halftone units following the changes in the types of the halftone dots. In the technique disclosed in the aforementioned patent, however, the plurality of types of halftone dots are merely different in dot shapes from each other, with a common minimum repeating unit. Thus, this technique cannot satisfy the aforementioned requirement.

SUMMARY OF THE INVENTION

The present invention is directed to a method of recording a halftone dot image having a plurality of original image components on a photosensitive material by scanning the same with an exposure beam on the basis of halftone dot signals. According to the present invention, the method comprises the steps of storing plural types of screen pattern signals in memory means, each the screen pattern signal having a different minimum repeating unit associated with at least screen ruling of halftone dots, determining a pattern selection signal for each the original image component, the pattern selection signal designating a type of the screen pattern signal, reading the type of the screen pattern signal corresponding to the pattern selection signal from the memory means and generating the halftone dot signal by comparing an image signal of the original image component with the screen pattern signal read out from the memory means.

The present invention is also directed to an apparatus having a structure which is suitable for carrying out the method of recording a halftone dot according to the present invention.

In the halftone dot recording technique according to the present invention, a plurality of types of screen pattern signals having different minimum repeating units are so stored that each type of screen pattern signal is read by an outputted address signal. The address signal is outputted for each type of screen pattern signal.

On the other hand, a pattern selection signal, which is designated for each original image component, corresponding to each type of screen pattern signal is so stored that a corresponding type of screen pattern signal is selectively outputted on the basis of this pattern selection signal.

Then, image signals of the total image are compared with the selectively outputted screen pattern signal, to output halftone dot signals on the basis of the result. Thus, it is possible to record halftone dots having different minimum repeating units for the respective original image components. As a result, it is possible to record such halftone dots by properly changing screen line numbers and angles of the halftone dots for the respective original image components.

Accordingly, an object of the present invention is to provide a halftone dot recording technique, which is adapted to select a plurality of types of halftone dots accompanying differences in minimum repeating units for the halftone dots in response to respective original image components thereby recording a total image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a model diagram showing an exemplary total image formed by a plurality of original image components in the embodiment of the present invention;

FIG. 4 is a model diagram showing exemplary halftone dots recorded at three different screen angles θ in the embodiment of the present invention;

DESCRIPTION OF THE PREFERRED EMBODIMENTS

Figure 1:
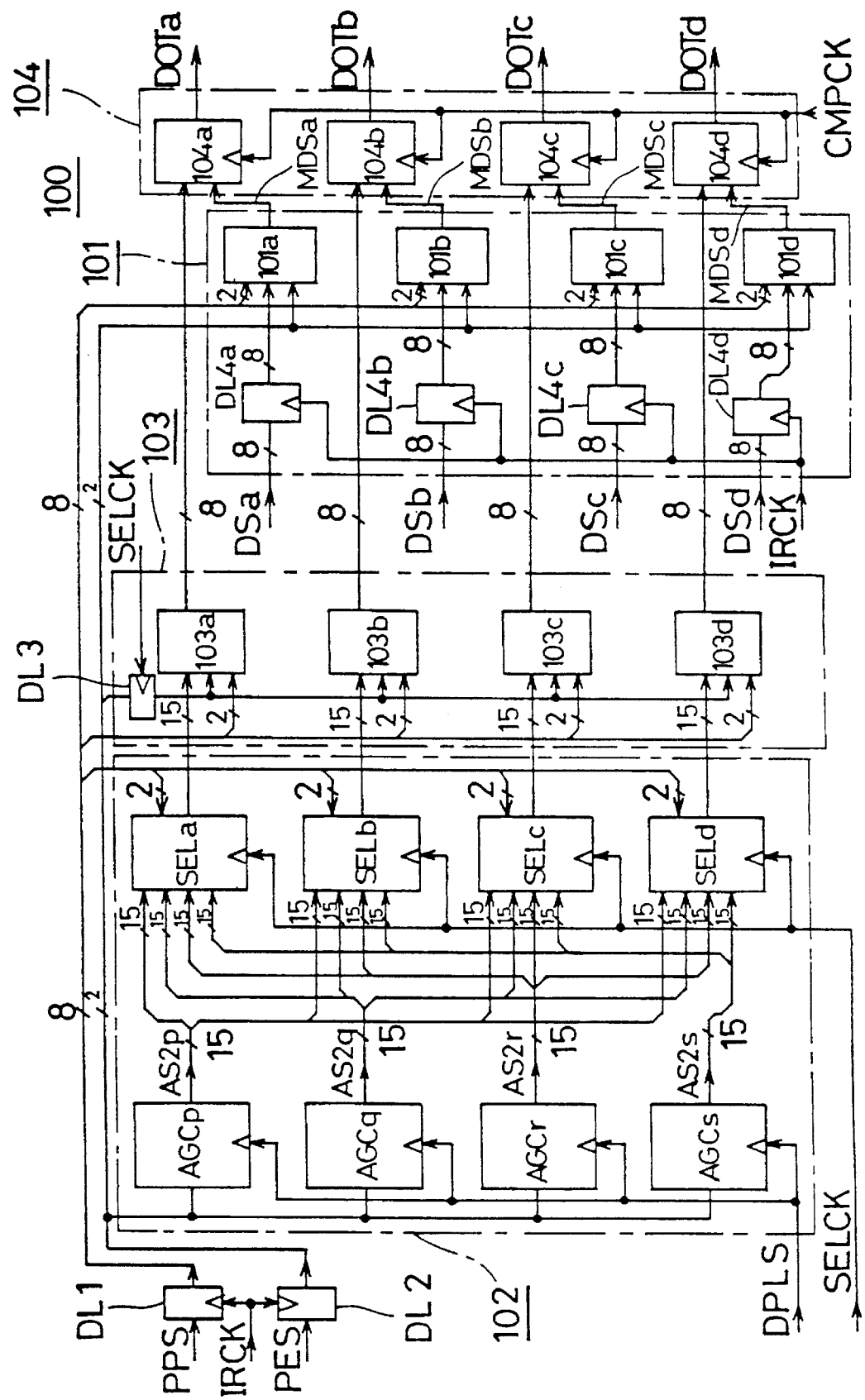
FIG. 1 is a circuit diagram showing an internal circuit in an embodiment of the present invention.

<1. Schematic Operation of Halftone Dot Recording Apparatus>

The operation of a halftone dot recording apparatus according to the present invention is now schematically described. FIG. 2 is a model diagram showing an exemplary total image 1 which is formed by arranging a plurality of original image components in combination. Referring to FIG. 2, the total image 1 is formed by arranging an original image component 2a which is a picture, original image components 2b which are characters, an original image component 2c which is a screen tint (recorded at a uniform halftone dot area rate (dot %)), original image components 2d which are keylines (lineworks), and an original image component 2e which is another picture. The halftone dot recording apparatus according to the present invention records a halftone dot image of the total image 1 on a photosensitive film. At this time, the apparatus properly selects one from a plurality of types of halftone dots generally having different minimum repeating units for each original image component, to screen the same.

Figure 3A:
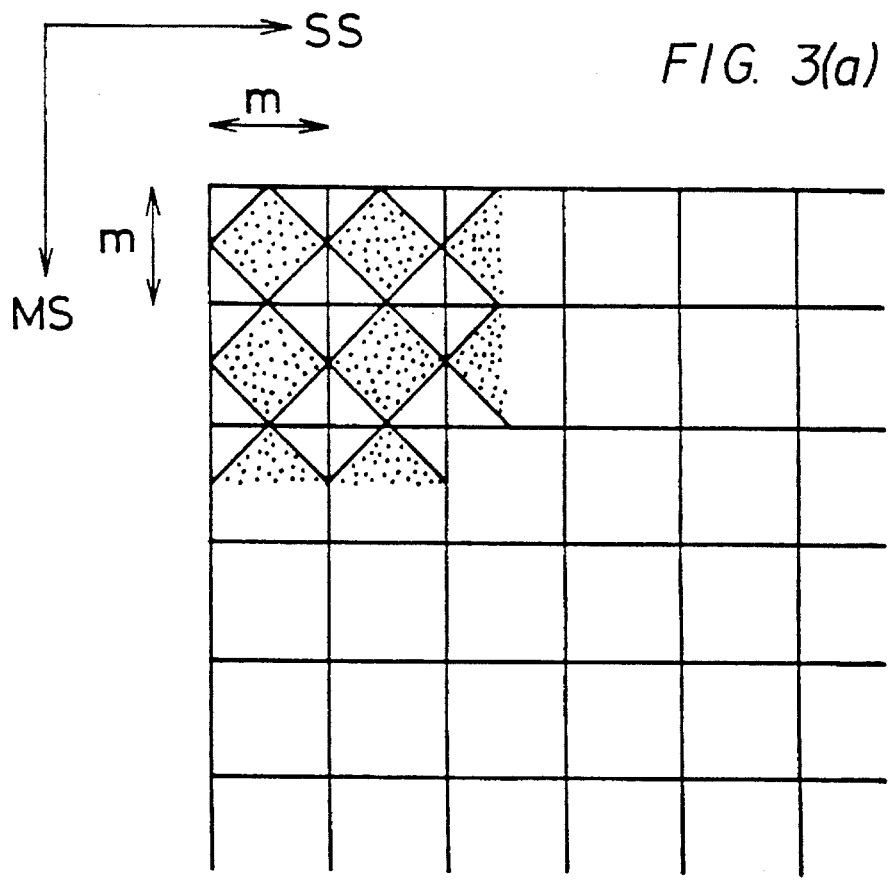
FIG. 3 is a model diagram showing exemplary halftone dots having different minimum repeating units in the embodiment of the present invention.
Figure 3B:
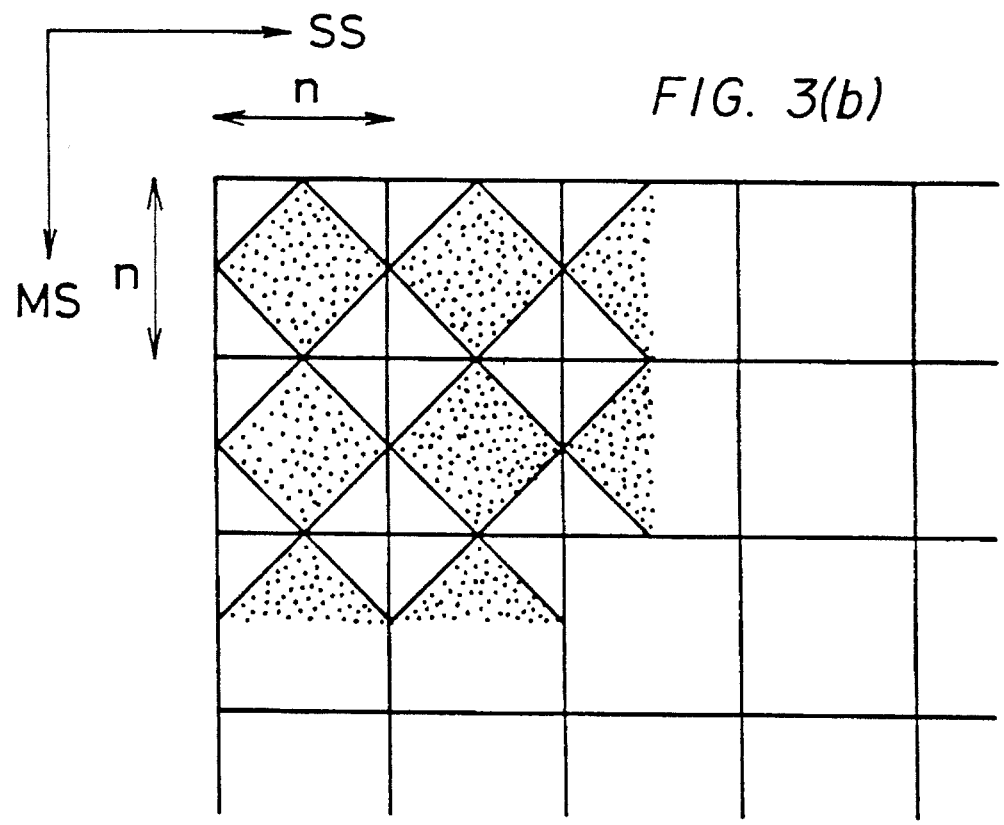

FIG. 3 shows exemplary halftone dots having different minimum repeating units. This figure illustrates shapes of halftone dots which are screened at halftone dot area rates of 50%, for example, with edge lengths of m and n (m<n) of minimum repeating units at (a) and (b) respectively. The minimum repeating units are defined by small sections of m by m and n by n in size, which are two-dimensionally developed in repetition along a main scanning direction MS and a subscanning direction SS, so that image regions corresponding to prescribed original image components are screened respectively. In recording of such halftone dots, scanning lines along a main scanning direction MS and a subscanning direction SS are constant in density throughout the total image 1. The example shown at (b) in FIG. 3 is smaller in screen ruling than that shown at (a).

In order to improve a visual effect in a final print, it may generally be necessary to screen original image components with screen rulings which are properly different from each other. It is possible to switch the screen rulings by switching pitch of exposure beams. However, it is problematic to switch such pitch of exposure beams in an intermediate stage of a process for recording the halftone dots of the total image 1, in view of working efficiency and image quality of the final print. The halftone dot recording apparatus according to the present invention can record the halftone dots in minimum repeating units which are varied with the original image components, whereby it is possible to carry out screening with properly different screen rulings in response to the respective original image components by properly changing the minimum repeating units of the halftone dots along the original image components while fixing the pitch of the exposure beams.

On the other hand, hue to be enhanced may be varied with the original image components. In this case, it is necessary to change a screen angle (angle formed by a main scanning or subscanning line and the direction for repetition of the halftone dots) corresponding to each color separation for each original image component, in order to suppress appearance of interference fringes (moires) between a plurality of color separations which are related to the hue to be enhanced. FIG. 4 shows exemplary halftone dots, having the same shapes, which are recorded at three different screen angles θ with halftone dot area rates of 50% similarly to those shown in FIG. 3, at (a) to (c) respectively. It is assumed that 23 scanning lines form each of two edges of the minimum repeating unit of a halftone dot at a screen angle θ of 0° as shown at (a) in FIG. 4, for example. When halftone dots of the same shapes and sizes are recorded at a different screen angle θ of 45°, on the other hand, 65 scanning lines form each of two edges of the minimum repeating unit of the halftone dots, as shown at (b) in FIG. 4. When halftone dots are recorded at a screen angle θ of 15°, further, 260 scanning lines form each of two edges of the minimum repeating unit of the halftone dots, as shown at (c) in FIG. 4. Namely, when halftone dots of the same shapes and the same sizes are thus recorded at different screen angles, the minimum repeating units of the halftone dots are generally different from each other. The halftone dot recording apparatus according to the present invention can record halftone dots in minimum repeating units which are varied with respective original image components, whereby it is possible to record the halftone dots at properly different screen angles in response to the respective original components.

<2. Overall Structure of Image Recording System>

Figure 5:
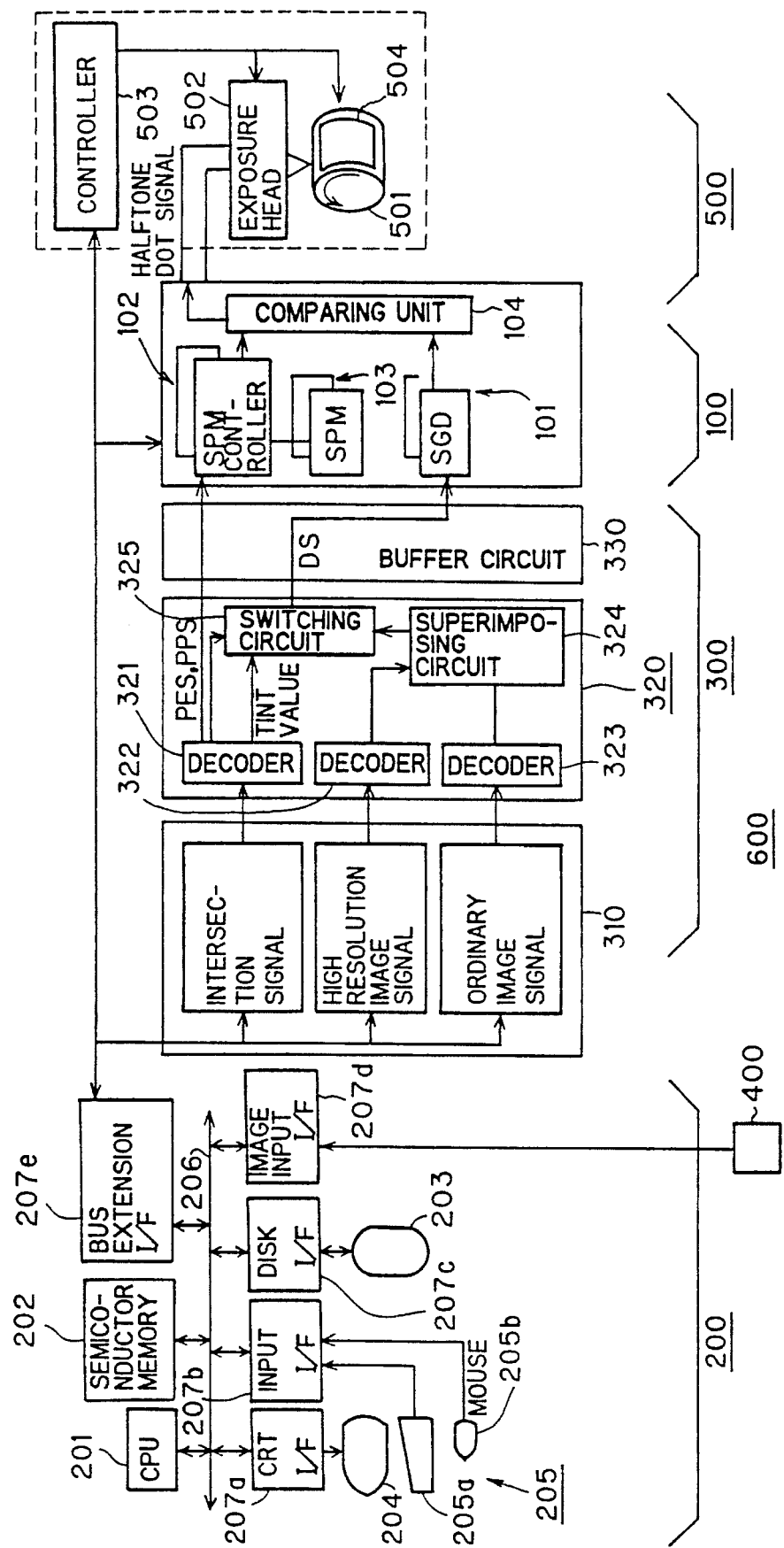
FIG. 5 is a block diagram showing a schematic structure of an image recording system comprising the halftone dot recording apparatus according to the embodiment of the present invention.

FIG. 5 is a block diagram schematically showing structures of a halftone dot recording apparatus 100 according to this embodiment and peripheral units which are related thereto. According to this embodiment, the halftone dot recording apparatus 100 is integrated in an image recording system 600, which comprises a work station 200, a synthetic unit 300, an image reader 400 and an output unit 500 which are connected to the halftone dot recording apparatus 100. The image reader 400 reads respective original image components with optical reading unit, and converts the same to image signals respectively.

<3. Schematic Structure and Operation of Output Part>

The output unit 500 records halftone dots on a photosensitive film 504 which is set on a rotary drum 501 on the basis of halftone dot signals transmitted from the halftone dot recording apparatus 100. An exposure head 502 emits a plurality of, e.g., four exposure beams (not shown) which are modulated in response to values "1" and "0" of the halftone dot signals. The photosensitive film 504 is stuck on the rotary drum 501, so that four types of halftone dot images corresponding to Y, M, C and K separations are recorded on the photosensitive film 504. It is assumed that the halftone dot images of the Y, M, C and K separations are recorded on respective ones of four regions of the photosensitive film 504 which are divided along a main scanning direction in this embodiment. The exposure head 502 moves in a direction (subscanning direction) along the rotation axis of the rotary drum 501 by a space corresponding to four scanning lines every rotation of the rotary drum 501. Thus, the halftone dots are recorded on the photosensitive film 504 along both of the main scanning and subscanning directions.

A controller 503 adjusts the speed of rotation of the rotary drum 501 and a scanning position of the exposure head 502 on the basis of control signals transmitted from a CPU 201 which is provided in the work station 200 as described later. Thus, the halftone dots are recorded on appropriate positions of the photosensitive film 504.

<4. Schematic Structure of Work Station>

The work station 200 makes up the total image on the basis of the image signals (component image signals) of the respective original image components transmitted from the image reader 400. The work station 200 comprises a central processing unit (CPU) 201, a semiconductor memory 202, a hard disk 203, a display unit 204, and operation input units 205. The work station 200 further has a bus line 206 for transmitting the image signals and various control signals, and various interfaces 207a to 207e are appropriately provided in portions connecting the bus line 206 with the aforementioned various units and the exterior. The CPU 201 controls operations of various units provided in the interior and the exterior of the work station 200.

<5. Makeup of Total Image>

The work station 200 incorporates the component image signals transmitted from the image reader 400, and stores the same in the hard disk 203. Namely, the hard disk 203, which is a recording medium, stores the image signals of all original image components to be made tip. The image signals of the original image components have contour edge signals (PG signals) for the respective original image components, and further have picture signals (CT signals) for respective picture original image components when the original image components are picture images. In making tip, the image signals of the original image components are read from the hard disk 203 and temporarily stored (loaded) in the semiconductor memory 202.

Then, the image signals of the original image components, which are objects to be made up, are read from the semiconductor memory 202, so that the original image components are displayed on the display unit 204 with already made up original image components and the total image. Selection of specific original image components, display thereof and the like are based on instructions by an operator. When the operator gives instructions through a keyboard 205a and a mouse 205b provided in the operation input units 205, instruction signals corresponding to the contents of the instructions are transferred to the CPU 201. The CPU 201 decodes the instruction signals and transmits proper control signals, so that the semiconductor memory 202, the hard disk 203 and the display unit 204 carry out prescribed operations on the basis of the control signals.

Figure 6:
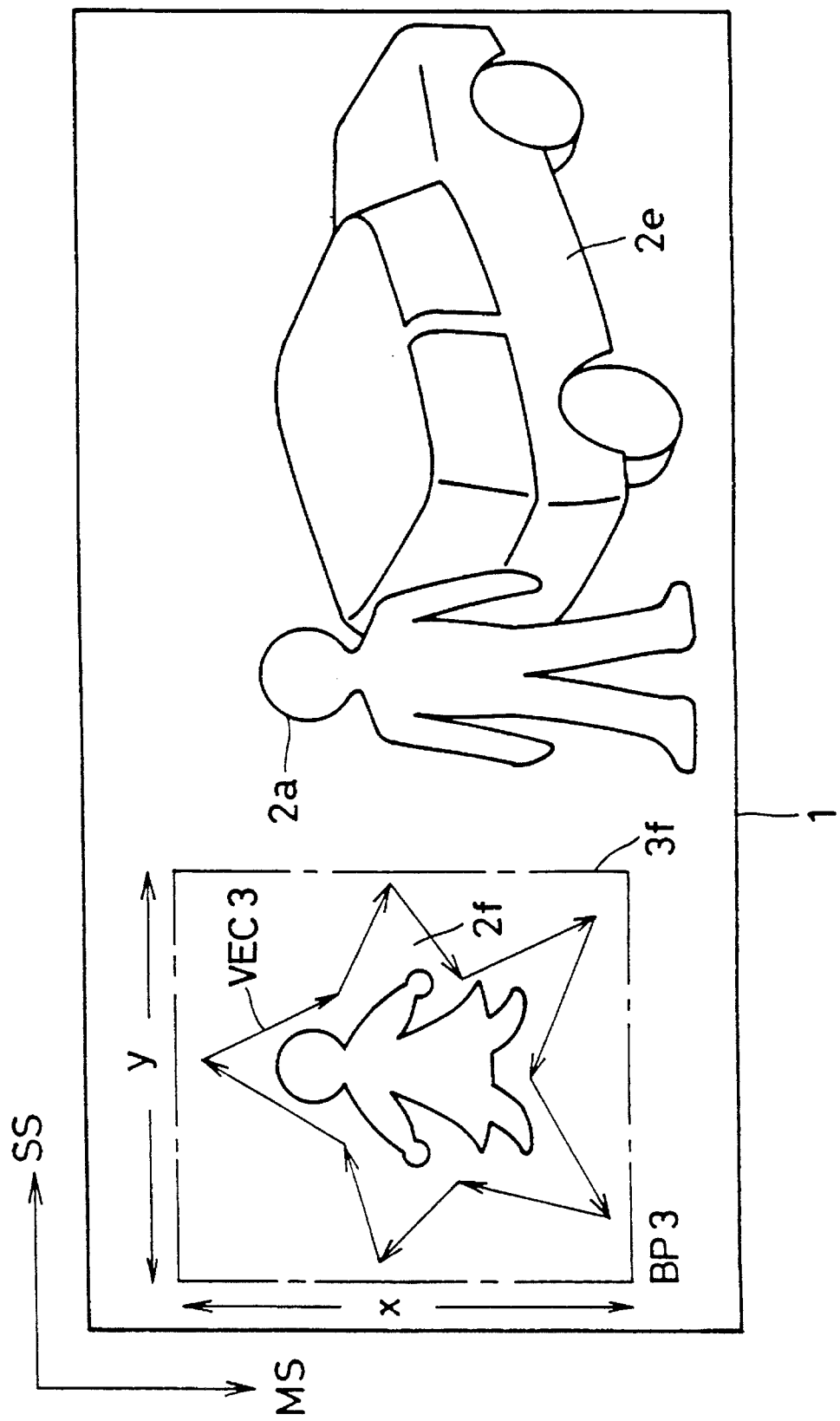
FIG. 6 is a model diagram showing an exemplary display on a display screen in a step of editing original image components in the embodiment of the present invention.

FIG. 6 illustrates exemplary display on the display trait 204 in a step of making up the total image. Referring to FIG. 6, original image components 2a and 2e are already completely laid out on a total image 1, while processing of an original image component 3f which is a picture is newly in progress. The operator properly drives the operation input units 205 while visually recognizing the display image on the display unit 204, to implement the makeup. First, the operator designates a portion (an original image component 2f) of the original image component 3f, which is the object of making up, to be laid out on the total image 1. Namely, he successively indicates start and end points of a plurality of vectors VEC3 forming the contour of the original image component 2f, as shown in FIG. 6. Then, he moves the original image component 3f to a desired layout position on the total image 1, to designate the layout position. When the original image components as laid out partially or entirely overlap with each other, he indicates priority in display of the original image components to appear on the display unit for the respective original image components. As to the original image components 2a and 2e, for example, the original image component 2a has higher priority. Further, he designates shapes of halftone dots, screen rulings and screen angles for the respective original image components. Due to an operation of the CPU 201, various contents of such instructions related to the layout are reflected on the image signals of the corresponding original image components which are stored in the semiconductor memory 202.

<6. Structure of Image Signal of Original Image Component>

Figure 7A:
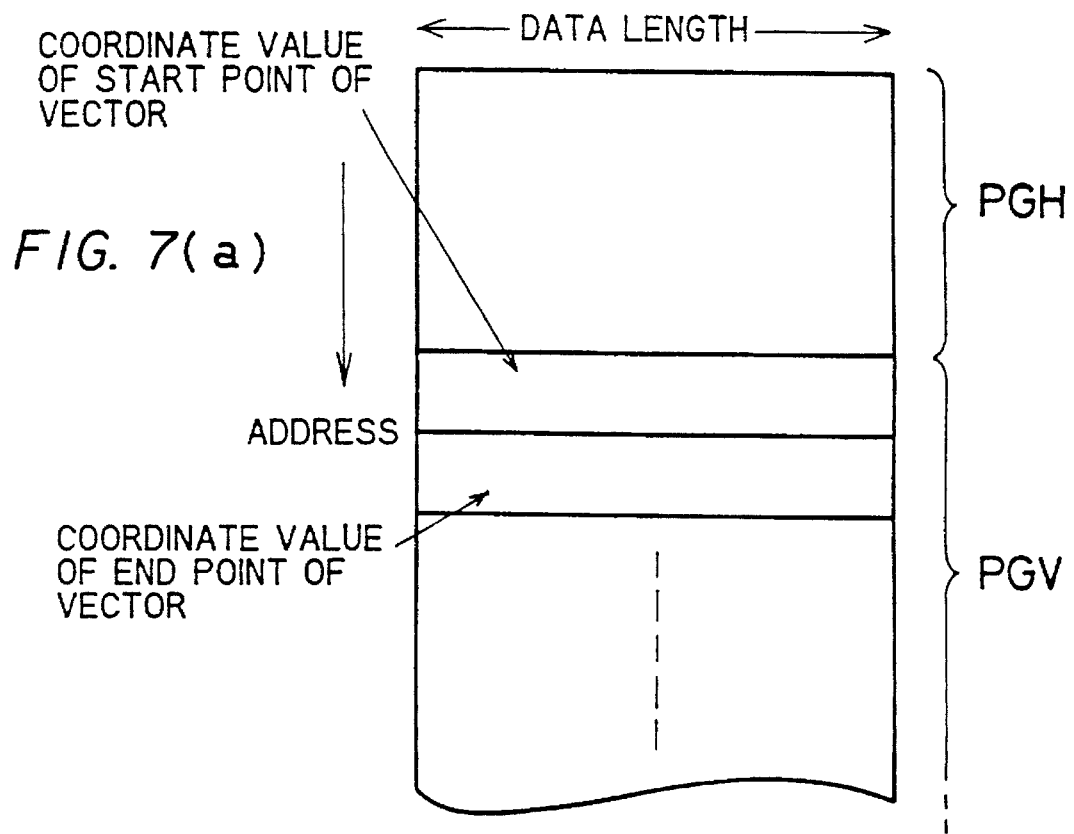
FIG. 7 is a structural diagram showing structures of PG and CT signals following original image components in the embodiment of the present invention.
Figure 7B:
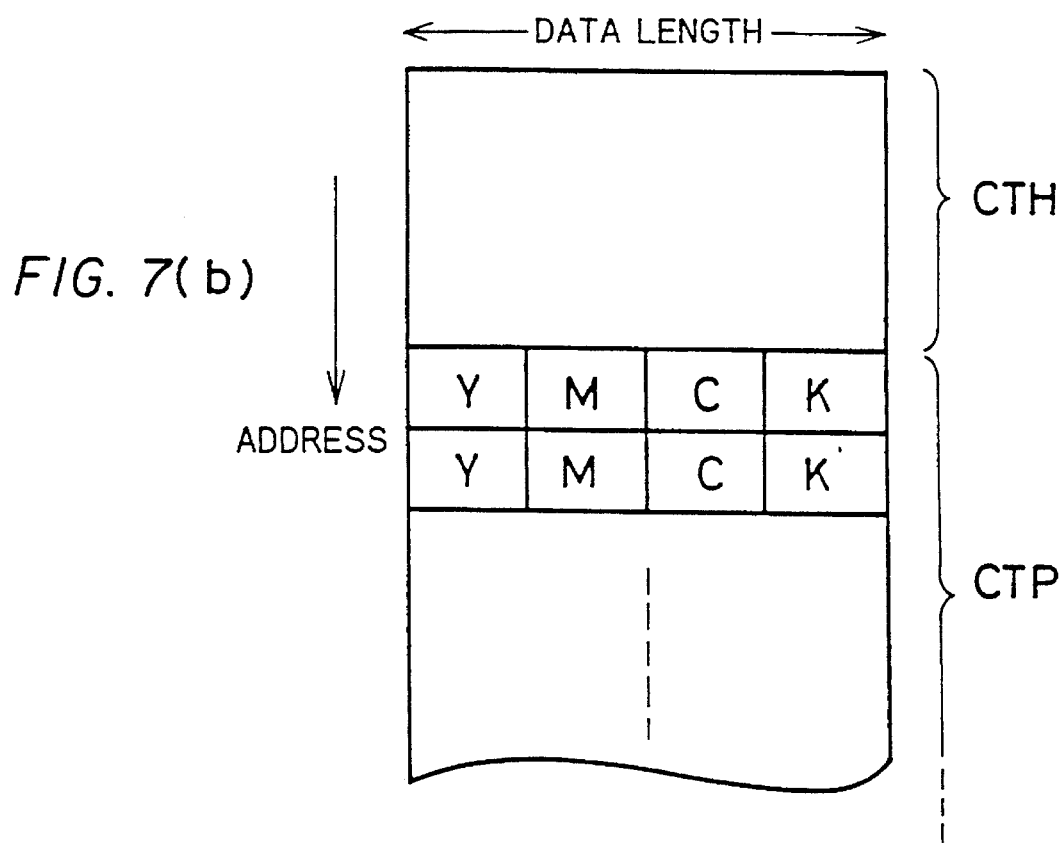

FIG. 7 is a structural diagram showing structures of a PG signal (at (a)) following an original image component and a CT signal (at (b)) corresponding thereto. The PG signal has a header region PGH and a vector signal region PGV. An identification signal for identifying a corresponding CT signal is written in the header region PGH when the original image component is a picture, while signals corresponding to the type of a color separation and a density value in tint laying or solid (recording at a halftone dot area rate of 100%) are written therein when the original image component is not a picture. In addition, signals expressing a position coordinate value of a base point expressing a layout position, priority of drawing, the shape of the halftone dot, the screen ruling and the screen angle are written in the head region PGH. On the other hand, signals expressing start or end point of the vector are written in the vector signal region PGV by relative coordinate values with respect to a base point, while a signal expressing a character or a linework forming the original image component is also written therein when the original image component is the character or the linework. These signals are appropriately corrected or additionally written in correspondence to contents of instructions in the aforementioned making up process.

The CT signal has a header region CTH and a pixel signal region CTP. Values of widths x and y expressed by pixel numbers along the main scanning direction MS and the subscanning direction SS of the original image component are written in the header region CTH respectively. On the other hand, density values of four types of color separations, i.e., a yellow separation (Y separation), a magenta separation (M separation), a cyan separation (C separation) and a black separation (K separation) are written in the pixel signal region CTP every pixel forming the original image component which is a picture.

The halftone dot is recorded in units of light spot (spot) of the exposure beam. The coordinate values of the aforementioned vectors are in units of μpixels each formed by integral times the spot such as 2 by 2 spots, for example. The aforementioned pixels are formed by integral times the μpixel, such as 5 by 5 μpixels.

<7. Conversion of Image Signal of Original Image Component>

In the work station 200, three types of signals including an intersection signal, a high resolution image signal and an ordinary image signal related to the total image are produced on the basis of the PG signal and the CT signal of each original image component which is completely made up.

Figures 8, 9:
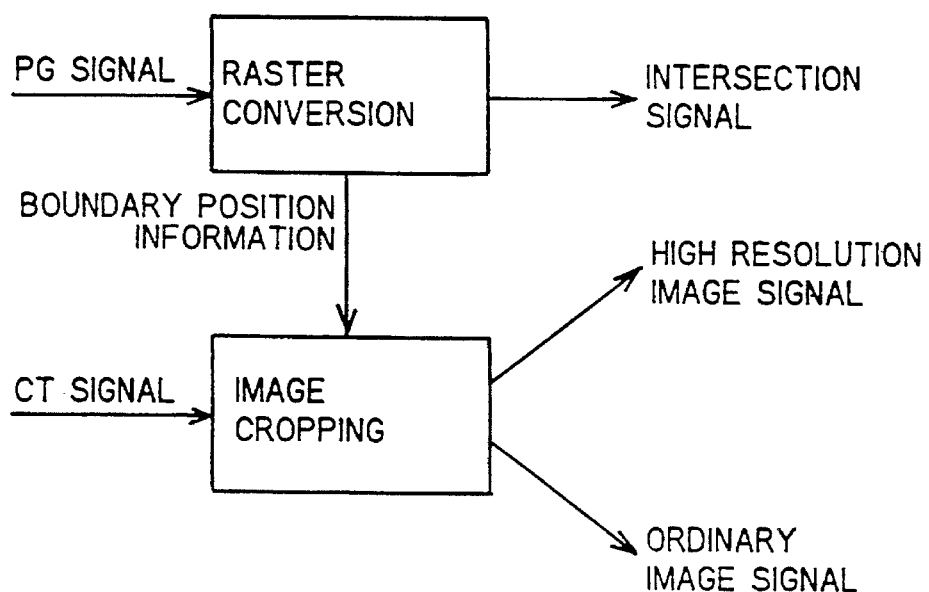
FIG. 8 is a process diagram showing a flow of processing for producing signals related to three types of total images from the PG and CT signals in the embodiment of the present invention.
FIG. 9 is a structural diagram showing a structure of an intersection signal in the embodiment of the present invention.

FIG. 8 is a process diagram typically showing a flow of this processing. Coordinate values of start and end points of the vectors provided in the PG signal are subjected to the so-called raster conversion, so that positions of μpixels corresponding to the boundary of the original image component on scanning lines are calculated and converted to the intersection signal. FIG. 9 shows an exemplary structure of such an intersection signal. The intersection signal is formed by a 32-bit binary signal, for example, and the positions of the aforementioned μpixels corresponding to the boundary are expressed by addresses on a memory region corresponding to respective spots on the scanning lines. Referring to FIG. 9, a pattern selection signal PPS is adapted to designate one of a plurality of screen patterns as described later, while an attribute signal is adapted to express information such that a tint, a picture or solid is started or ended at the boundary, and a tint value signal is adapted to express density of the tint when the attribute is the tint.

Referring again to FIG. 8, the so-called "cropping" is carried out on the basis of the CT signal and the positional information on the μpixels corresponding to the boundary obtained by the raster conversion, to produce image signals corresponding to the total image. Namely, obtained are an ordinary image signal expressing density of each color separation every pixel in correspondence to an image region which is a picture in the total image, and a high resolution image signal expressing the boundary in units of the μpixels in correspondence to pixels including the boundary of the original image component. The as-obtained three types of signals are stored in the hard disk 203.

<8. Schematic Structure and Operation of Synthetic Unit>

Referring again to FIG. 5, the synthetic unit 300 produces signals expressing density values of the separations in units of the μpixels on the basis of the intersection, high resolution image and ordinary image signals produced in the work station 200. The synthetic unit 300 is formed by hardware with no built-in software, to process the signals at a high speed in synchronization with an operation of the output unit 500 for recording the halftone dots on a photosensitive film or the like. Namely, the synthetic unit 300 processes the signals in units of the respective spots sequentially along the main scanning direction in synchronization with scanning in the output unit 500. Since the output unit 500 comprises four exposure beams to simultaneously record the halftone dots along four scanning lines, the synthetic unit 300 processes the signals simultaneously along a plurality of scanning lines.

The intersection, high resolution image and ordinary image signals stored in the hard disk 203 are read out and held in a buffer 310 every constant quantity. The buffer 310 is adapted to absorb fluctuation in transmission speed from the hard disk 203. A synthetic processing unit 320 receives these signals from the buffer 310, and inputs the same in decoders 321 to 323 respectively. The decoders 321 to 323 decode these signals, and indicate operations in a superimposing circuit 324 and a switching circuit 325.

The superimposing circuit 324 outputs the density value of the color separation provided in the ordinary image signal with respect to the pixels when the pixels to be processed are included in those of a picture expressed by the ordinary image signal. When the pixels to be processed are included in those having the boundary of the original image component expressed by the high resolution image signal, on the other hand, the superimposing circuit 324 outputs the density value thereof expressed by the high resolution image signal.

The switching circuit 325 selects either a signal related to a tint or solid provided in the intersection signal or that outputted from the superimposing circuit 324 in correspondence to whether the positions of the μpixels to be processed are for the tint or the solid, or the picture, and outputs the same as a pixel signal DS expressing density in units of the μpixels.

The decoder 321 outputs the pattern selection signal PPS and a separation switching signal PES indicating switching of each color separation in synchronization with successive recording of the halftone dots in the photosensitive film 504 following rotation of the rotary drum 501. The pattern selection signal PPS, the separation switching signal PES and the pixel signal DS are temporarily held in the buffer circuit 330, and thereafter inputted in the halftone dot recording apparatus 100 respectively.

<9. Schematic Structure of Halftone Dot Recording Apparatus>

The halftone dot recording apparatus 100 is formed by hardware with no built-in software similarly to the synthetic unit 300, to sequentially process signals in units of spot in synchronization with the operation of the output unit 500 for recording the halftone dots on the photosensitive film 504 or the like.

The halftone dot recording apparatus 100 first converts the density value of the color separation provided in the pixel signal DS by an SGD (screen gradation) 101 on the basis of a prescribed rule, and reads a screen pattern (SP) signal stored in an SPM (screen pattern memory) 103 by an SPM controller 102. The SP signal, which forms the basis of formation of the halftone dots, defines a threshold value obtained by making a numerical value in a range of 0 to 255, which can be expressed in an 8-digit binary number, for example, correspond to each one of spots on the aforementioned minimum repeating units of the halftone dots. Therefore, such SP signals generally have different signal volumes in correspondence to the differences between the minimum repeating units of the halftone dots. A plurality of, e.g., four types of SP signals are previously prepared in the SPM 103 in response to the respective color separations, so that the SPM controller 102 properly selects one from the same.

A comparing unit 104 compares the threshold value expressed by the SP signal with the pixel signal DS corrected in the SGD 101 every spot, to output a halftone dot signal in response to the result of the comparison.

<10. Internal Circuit of Halftone Dot Recording Apparatus>

FIG. 1 is a circuit diagram showing an internal circuit of the halftone dot recording apparatus 100. The exemplary apparatus shown in the circuit diagram of FIG. 1 is so formed as to sequentially process spots on four scanning lines in parallel with each other on the premise that the output unit 500 is provided with four exposure beams.

Clock pulse signals IRCK, DPLS, SELCK and CMPCK are generated from a timing control circuit (not shown), to repeatedly rise in synchronization with operations of the output unit 500 for recording the halftone dots for the respective spots. Latches DL1 to DL3 and DL4a to DL4d sequentially hold the separation switching signal PES, the pattern selection signal PPS and pixel signals DSa to DSd outputted from the buffer circuit 330 in synchronization with these clock pulses.

{10-1. SPM 103}

The SPM 103 is provided with for SPMs 103a to 103d in parallel with each other, in correspondence to the four exposure beams. Each of the SPMs 103a to 103d is a random access memory (RAM), which previously stores four types of SP signals at the maximum every color separation, i.e., 16 types of SP signals at the maximum in total, in advance of starting of image recording processing. Address signal lines and data signal lines which are connected to the SPM 103 are switched by a tristate buffer (not shown) or the like, for example, to form parts of the memory region of the CPU 201, thereby writing the SP signals. Since single scanning is carried out by four exposure beams according to this embodiment, the respective SPMs 103a to 103d store SP signals of scanning lines exposed by the corresponding exposure beams.

Each of data selectors SELa to SELd is a circuit having a function of selecting one from four types of 15-bit input signals on the basis of the pattern selection signal PPS and outputting the same.

{10-2. Address Generation Controller}

Address generation controllers AGCp to AGCs output address signals AS2p to AS2s designating storage positions of the SP signals respectively when the SP signals stored in the SPMs 103a to 103d are read out. Such four address generation controllers AGCp to AGCs are provided to output four address signals AS2p to AS2s, since one is selected from four types of halftone dots with respect to one separation.

Figure 10:
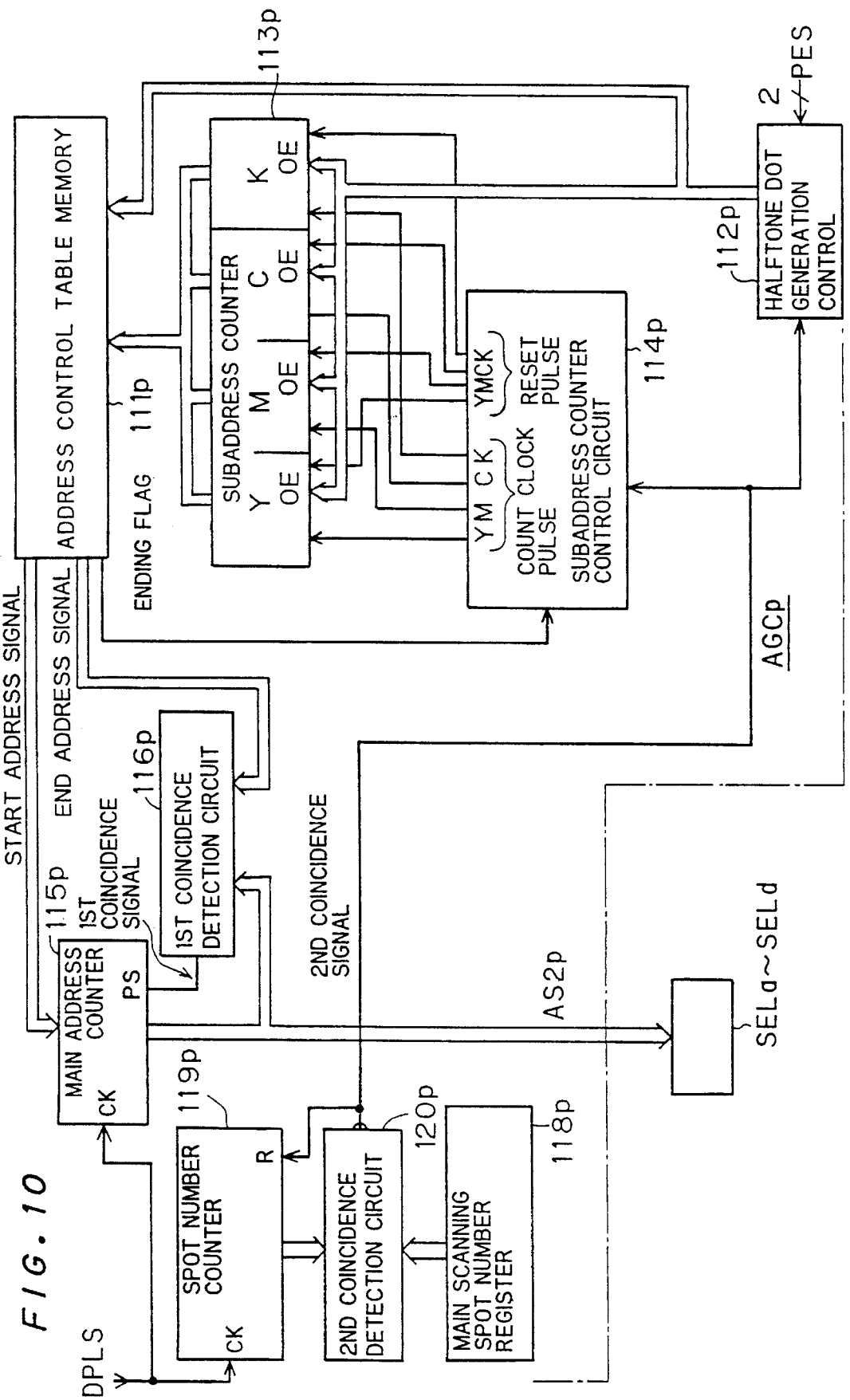
FIG. 10 is a block diagram showing an internal structure of an address generation controller in the embodiment of the present invention.
Figure 11:
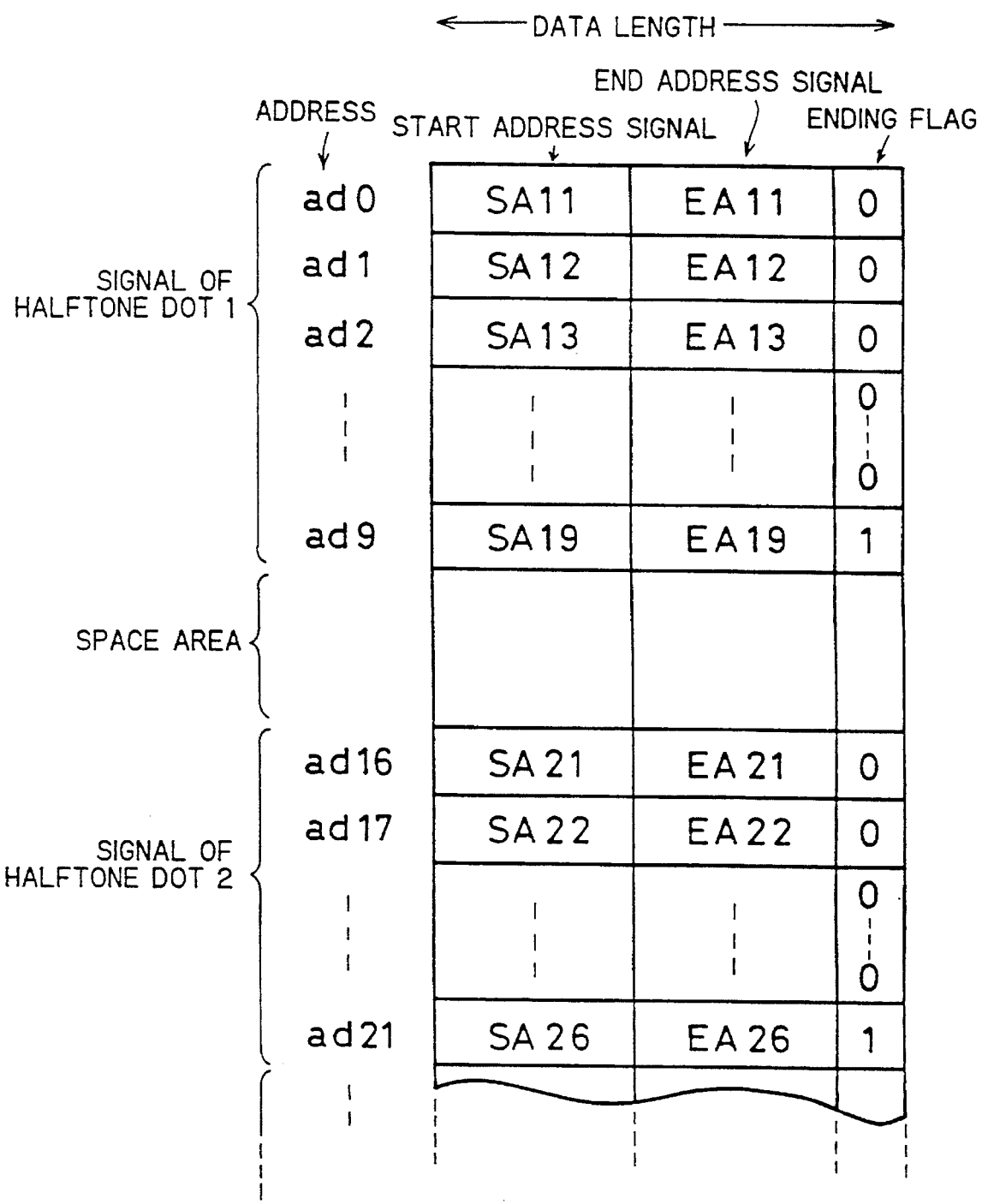
FIG. 11 is a structural diagram showing structures of address control signals in the embodiment of the present invention.

FIG. 10 is a block diagram showing an internal structure of the address generation controller AGCp. The remaining address generation controllers AGCq to AGCs also have similar structures. An address control table memory 111p previously stores address control signals following storage of the SP signals in the SPM 103. FIG. 11 shows structures of the address control signals. The address control signals have start address signals, end address signals and ending flags. Referring to FIG. 11, an address control signal in a storage position designated by addresses ad0 to ad9 corresponds to a SP signal of a first separation, and an address control signal in addresses ad16 to ad21 corresponds to an SP signal of a second separation, for example. The address control table memory 111p stores address control signals corresponding to four types of SP signals which are employed for the four types of color separations. The ending flags, which are signals having 1-bit data lengths, have values "1" in final addresses of the respective SP signals and values "0" in other addresses.

In the example shown in FIG. 11, first and second SP signals are formed by 40 (10×4) and 24 (6×4) spots respectively. These numbers correspond to sizes of the minimum repeating units of the halftone dots formed by the respective SP signals (minimum repeating units of the SP signals) along the subscanning direction, i.e., numbers of spots of the SP signals defining threshold values arranged along the subscanning direction. The sizes of the minimum repeating units of the SP signals along the main scanning direction, i.e., the numbers of the spots of the SP signals defining the threshold values arranged along the main scanning direction are provided by differences between the respective end address signals and the start address signals.

Referring again to FIG. 10, address and data signal lines which are connected to the address control table memory 111p are switched to form parts of the memory regions of the CPU 201, so that the address control signals are written in the address control table memory 111p, similarly to the aforementioned SP signals. As to the address control table memory 111p, the address control signals for the corresponding color separation are stored in four regions divided by high-order two bits of the addresses respectively.

The 2-bit separation switching signal PES is inputted in a halftone dot code generation control circuit 112p. This halftone dot code generation control circuit 112p latches the received separation switching signal PES as a separation designating signal, and transmits the as-latched separation switching signal PES and control signals described later to a subaddress counter 113p and the address control table memory 111p.

The subaddress counter 113p comprises four types of counters in correspondence to the respective color separations. A count signal is inputted in the address control table memory 111p from a counter corresponding to the separation designated by the halftone dot code generation control circuit 112p. The address control table memory 111p supplies a start address signal in an address obtained by adding a count value expressed by the count signal outputted from the subaddress counter 113p to an address (high order 2 bits) designated by the halftone dot code generation control circuit 112p to a main address counter 115p, and supplies an end address signal to a first coincidence detection circuit 116p.

The main address counter 115p holds the start address signal, and outputs the same to the data selectors SELa to SELd as the address signal AS2p. The main address counter 115p further successively increments the value of the held signal in synchronization with the clock pulse DPLS, to output the same as the address signal AS2p. When this address signal AS2p is supplied to the SPM 103 through the data selectors SELa to SELd, SP signals along first to fourth scanning lines, for example, are successively read from the SPM 103. The output of the main address counter 115p is also supplied to the first coincidence detection circuit 116p, so that a first coincidence signal is outputted from the first coincidence detection circuit 116p to the main address counter 115p when the output coincides with the end address signal. The main address counter 115p restores its output to a start address signal again when the same receives the first coincidence signal, to repeat a similar operation. Thus, a series of SP signals along the first to fourth scanning lines are repeatedly read from the SPM 103. In other words, the minimum repeating units of the SP signals along the main scanning direction are repeatedly read out.

When halftone dots for a certain separation are completely outputted in single scanning, the separation switching signal PES from the decoder 321 changes and the halftone dot code generation control circuit 112p latches this signal to transmit the same to the address control table memory 111p and the subaddress counter 113p. Thus, the address control table memory 111p outputs start and end address signals for a new separation, to supply the same to the main address counter 115p and the first coincidence detection circuit 116p respectively. Consequently, the main address counter 115p holds the start address signal for the new separation, and outputs an address signal AS2p for the new separation.

A main scanning spot number register 118p previously stores a spot number corresponding to a recording range along the main scanning direction. A spot number counter 119*p* counts the clock pulse DPLS. A second coincidence detection circuit 120*p* compares this count value with the spot number stored in the main scanning spot number register 118*p*, to output a second coincidence signal to the halftone dot code generation control circuit 112*p* and the subaddress counter control circuit 114*p* when the values coincide with each other. The second coincidence signal indicates ending of recording operations on scanning lines (first to fourth scanning lines, for example). When the second coincidence signal is inputted in the halftone dot code generation circuit 112*p*, control signals indicating 0 to 3 are transmitted regardless of the separation switching signal PES, which is an input signal, in a short time before starting of next scanning lines (fifth to eighth scanning lines, for example), to successively select the counters for the respective separations provided in the subaddress counter 113*p*. Thus, address control signals stored in current addresses corresponding to the respective separations are successively outputted from the address control table memory 111*p*, so that ending flags therein are inputted in the subaddress counter control circuit 114*p*. The subaddress counter control circuit 114*p* outputs a count clock pulse or a reset pulse to the subaddress counter 113*p* every corresponding separation in response to the value of "0" or "1" of the ending flag when the second coincidence signal is inputted. If an ending flag corresponding to the Y separation is "0", for example, the subaddress counter control circuit 114*p* outputs one count clock pulse corresponding to the Y separation when the second coincidence signal is inputted. Thus, the counter of the subaddress counter 113*p* corresponding to the Y separation increments its count signal by 1. When the ending flag corresponding to the Y separation is "1", on the other hand, the subaddress counter control circuit 114*p* outputs one reset pulse corresponding to the Y separation. Thus, the counter of the subaddress counter 113*p* corresponding to the Y separation restores its count signal to zero. This also applies to the remaining separations.

When next scanning is started, the address control table memory 111*p* supplies a start address signal in an address which is obtained by adding a count value expressed by a new count signal outputted from the subaddress counter 113*p* to the address designated by the halftone dot code generation control circuit 112*p* in response to the separation switching signal PES to the main address counter 115*p*, and supplies an end address signal to the first coincidence detection circuit 116*p*. Thus, reading of the SP signals from the SPM 103 is updated in the subscanning direction, and returned to the initial stage upon completion of the minimum repeating units in the subscanning direction, to repeat a similar operation. Namely, the minimum repeating units of the SP signals in the subscanning direction are repeatedly read out from the SPM 103.

Thus, the minimum repeating units of the SP signals are two-dimensionally repeatedly read from the SPM 103 along both of the main scanning and subscanning directions.

{10-3. Operation of SPM 103}

Referring again to FIG. 1, one of the SP signals is properly selected from plural types of SP signals previously stored in the respective SPMs 103*a* to 103*d* in response to the separation switching signal PES every color separation, and further properly selected in response to the pattern selection signal PPS every original image component. Since the minimum repeating units of these SP signals are generally different from each other, one of the address signals is properly selected from the address signals AS2*p* to AS2*s* generated by the address generation controllers AGCp to AGCs by the data selectors SELa to SELd, to be inputted in the SPMs 103*a* to 103*d* respectively.

{10-4. Structure and Operation of SGD 101}

The SGD 101 is provided with four parallel SGDs 101*a* to 101*d* in correspondence to the four exposure beams. The SGDs 101*a* to 101*d* convert density values of a certain color separation provided in the pixel signals DSa to DSd outputted from the latches DL4*a* to DL4*d* in response to the separation switching signal PES and the pattern selection signal PPS on the basis of generally different conversion tables every color separation and original image component, to output the converted values as correction density signals MDSa to MDSd respectively. As to the data of the conversion tables in the SGDs 101*a* to 101*d*, address and data signal lines which are connected to the SGD 101 are switched to form parts of the memory region of the CPU 201 so that the correction density signals are written similarly to the aforementioned SP signals.

{10-5. Structure and Operation of Comparing Unit 104}

The comparing unit 104 is provided with four parallel comparators 104*a* to 104*d* in correspondence to the four exposure beams. These comparators 104*a* to 104*d* compare the correction density signals MDSa to MDSd received from the SGDs 101*a* to 101*d* with the SP signals received from the SPMs 103*a* to 103*d* respectively. The comparator 104*a* outputs a value "1" as a halftone dot signal DOTa when the correction density signal MDSa is greater than the SP signal, and outputs a value "0" in other case. The comparators 104*b* to 104*d* also output halftone dot signals DOTb to DOTd. The four exposure beams provided in the output unit 500 record halftone dots in response to these halftone dot signals DOTa to DOTd respectively.

<11. Another Embodiment>

Figure 12:
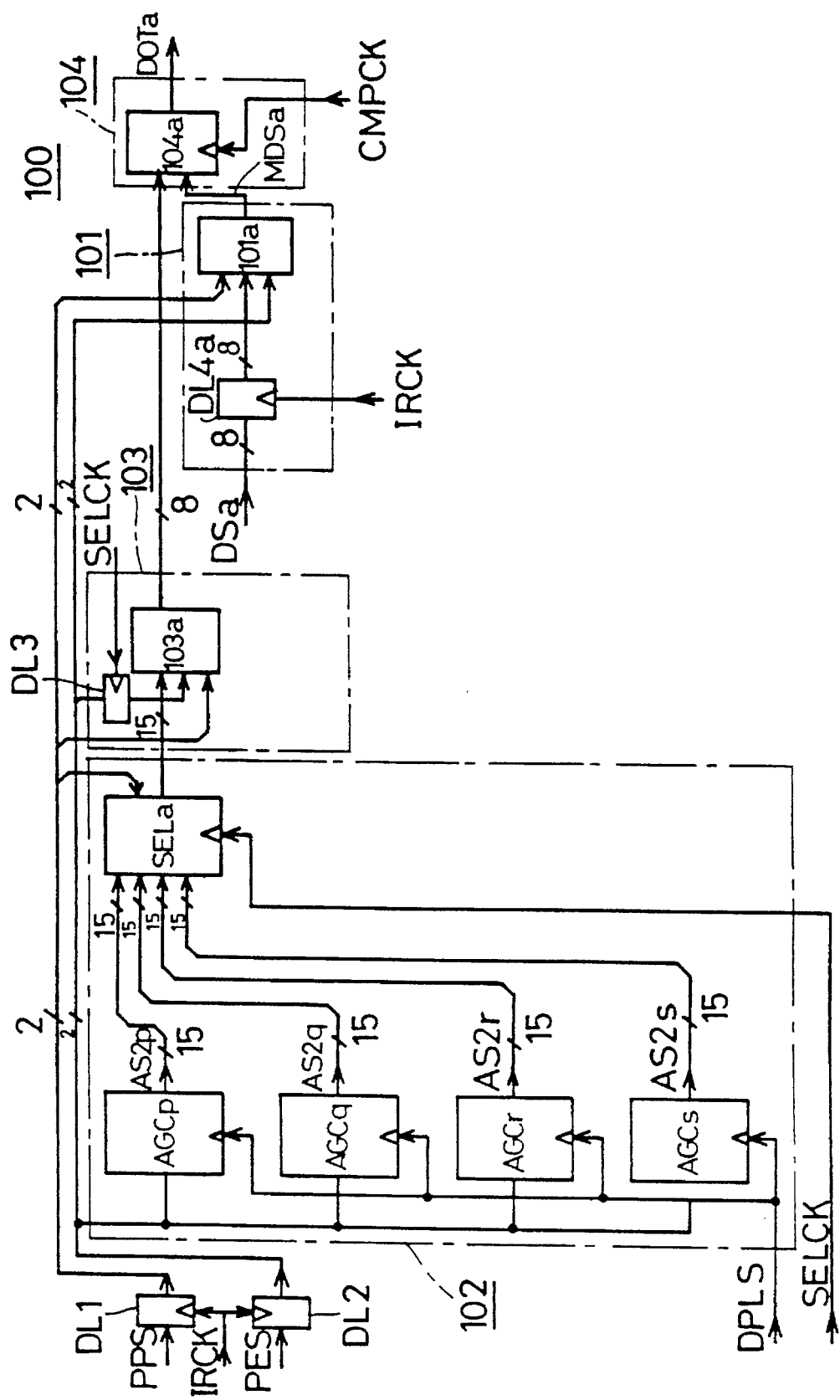
FIG. 12 is a circuit diagram showing an internal circuit of a halftone dot recording apparatus according to a second embodiment of the present invention.

In the aforementioned embodiment, the output unit 500 emits four exposure beams, and each part of the halftone dot recording apparatus 100 responsively comprises four systems in parallel with each other. Alternatively, the output unit 500 may emit a single exposure beam, and the halftone dot recording apparatus 100 is implemented in a circuit shown in FIG. 12 in this case. Namely, each of an SGD 101, an SPM controller 102, an SPM 103 and a comparing unit 104 has only one system corresponding to one scanning line. However, an address generation controller, which corresponds to types of SP signals, is provided with four systems even if one scanning line is to be simultaneously scanned. Other structure shown in FIG. 12 is identical to that of the embodiment shown in FIG. 1, and hence elements corresponding to those appearing in FIG. 1 are denoted by the same reference numerals, to omit redundant description.

In the aforementioned embodiment, further, the address signals AS2*p* to AS2*s* outputted from the plurality of address generation controllers AGCp to AGCs are supplied to the data selectors SELa to SELd respectively. Then, only one address signal is supplied to the SPMs 103*a* to 103*d* on the basis of the pattern selection signal PPS, to output only a corresponding SP signal. However, a structure for outputting an SP signal corresponding to a pattern selection signal PPS is not restricted to this.

For example, the SPM 103a is formed by four memories, so that respective types of SP signals are stored in the respective memories. Only corresponding ones of the address signals AS2p to AS2s are supplied to these memories, and SP signals are outputted from the respective memories in a parallel manner. Then, only an SP signal corresponding to the pattern selection signal PPS is selected by a data selector. This also applies to the SPMs 103b to 103d.

Although the SPM 103 stores SP signals which are based on rational tangents in the aforementioned embodiment, the same may alternatively store SP signals which are based on irrational tangents.

While the invention has been shown and described in detail, the foregoing description is in all aspects illustrative and not restrictive. It is therefore understood that numerous modifications and variations can be devised without departing from the scope of the invention.

What is claimed is:

1. A method of recording a halftone dot image having a plurality of original image components on a photosensitive material by scanning the plurality of original image components with an exposure beam on the basis of halftone dot signals, and a pitch of scanning lines formed with said exposure beam being substantially constant through recording of said halftone dot image, said method comprising the steps of:

storing plural types of screen pattern signals in a storing means, each said screen pattern signal having a different minimum repeating unit associated with a screen ruling of halftone dots, said plural types of said screen pattern signals being stored at respective address regions in said storing means, and each said screen pattern signal having a different minimum repeating unit associated with a screen angle of the halftone dots;

determining a pattern selection signal for each said original image component, said pattern selection signal designating a type of a screen pattern signal;

reading the type of said screen pattern signal corresponding to said pattern selection signal from said storing means;

generating a halftone dot signal by comparing an image signal of said original image component with said screen pattern signal read out from said storing means; and generating an address signal for reading out said screen pattern signal from one of said respective address regions in said storing means on the basis of said pattern selection signal.

2. An apparatus for recording a halftone dot image having a plurality of original image components on a photosensitive material by scanning the plurality of original image components with an exposure beam on the basis of halftone dot signals, and a pitch of scanning lines formed with said exposure beam being substantially constant through recording of said halftone dot image, said apparatus comprising:

first memory means for storing a plurality of image signals of said original image components;

second memory means for storing plural types of screen pattern signals, each said screen pattern signal having a different minimum repeating unit associated with a screen ruling of halftone dots, said plural types of said screen pattern signals being stored at respective address regions in said second memory means, and each said screen pattern signal having a different minimum repeating unit associated with a screen angle of the halftone dots;

third memory means for storing a pattern selection signal for each said original image component, said pattern selection signal designating a type of a screen pattern signal;

memory control means for reading the type of said screen pattern signal corresponding to said pattern selection signal of said third memory means, said memory control means having address generating means for generating an address signal on the basis of said pattern selection signal, said address signal being provided into said second memory means to read out said screen pattern signal from one of said respective address regions therein;

comparing means for comparing an image signal of an original image component stored in said first memory means with said screen pattern signal read out from said second memory means, whereby generating a halftone dot signal on the basis of the comparison thereof; and exposure means for emitting said exposure beam in response to said halftone dot signal onto said photosensitive material, wherein said address generating means comprises
      a counter for generating said address signal by counting a clock pulse of a scanning operation, and
      address control means for supplying said counter with a start address signal indicative of a start point of said screen pattern signal corresponding to said pattern selection signal, and for detecting an end address signal indicating of an end of said screen pattern signal corresponding to said pattern selection signal.

* * * * *